(12) United States Patent
Baierl

(10) Patent No.: US 7,684,530 B2
(45) Date of Patent: Mar. 23, 2010

(54) CIRCUIT ARRANGEMENT AND METHOD FOR SYNCHRONISED TRANSMISSION OF AUDIO DATA STREAMS IN A BUS SYSTEM

(75) Inventor: Wolfgang Baierl, Remshalden (DE)

(73) Assignee: Robert Bosch GmbH, Stuttgart (DE)

( * ) Notice: Subject to any disclaimer, the term of this patent is extended or adjusted under 35 U.S.C. 154(b) by 972 days.

(21) Appl. No.: 10/467,091

(22) PCT Filed: Jan. 22, 2002

(86) PCT No.: PCT/DE02/00184

§ 371 (c)(1),
(2), (4) Date: Dec. 23, 2003

(87) PCT Pub. No.: WO03/024008

PCT Pub. Date: Mar. 20, 2003

(65) Prior Publication Data

US 2004/0088595 A1    May 6, 2004

(30) Foreign Application Priority Data

Feb. 3, 2001    (DE) ................................. 101 04 876

(51) Int. Cl.
*H04L 7/00* (2006.01)
(52) U.S. Cl. ...................................................... 375/354
(58) Field of Classification Search ................. 375/354, 375/259, 355, 362, 316, 295, 219
See application file for complete search history.

(56) References Cited

U.S. PATENT DOCUMENTS 6,404,770 B1 * 6/2002 Fujimori et al. ............. 370/429

FOREIGN PATENT DOCUMENTS

WO    WO 9959047 A2 *  11/1999

\* cited by examiner

*Primary Examiner*—Kevin M Burd
(74) *Attorney, Agent, or Firm*—Kenyon & Kenyon LLP

(57) ABSTRACT

A method for synchronized transmission of audio data streams in a bus system, for example, based on the IEEE 1394 Standard, and a circuit system for performing said method including at least one data source and at least one data sink. The data source includes at least one clock or timer unit and at least one generator unit. The generator unit is connected to the clock or timer unit and receives at least one data frequency.

42 Claims, 2 Drawing Sheets

CIRCUIT ARRANGEMENT AND METHOD FOR SYNCHRONISED TRANSMISSION OF AUDIO DATA STREAMS IN A BUS SYSTEM

FIELD OF THE INVENTION

The present invention relates to a circuit system and to a method for synchronized transmission of audio data streams in a bus system based on, for example, the IEEE 1394 Standard.

BACKGROUND INFORMATION

Synchronization between data sources and data sinks in data buses which are based on asynchronous data transmission is conventionally achieved by the "time stamp" method. In this regard, methods have been developed for the IEEE 1394 Standard which likewise are based on the time stamp principle; the approach selected thus far, however, is based on the fact that the data source communicates the data sample rate to the data sink via a control channel before the transmission of the audio data begins.

Data packets having multiple audio data samples are subsequently transmitted via an isochronous data channel, each data packet being provided with a "time stamp" which represents the presentation time of the first audio data sample. The sample data frequency must be recovered using a phase locked loop (PLL) circuit and using information about the number of data samples per data packet.

SUMMARY

An object of an example embodiment of the present invention is to provide a circuit system and a method of the aforementioned type whereby the sample data frequency of the data source may be recovered in the data sink without a PLL circuit system. A further object of an example embodiment of the present invention is to enable the transmission of multiple audio channels via the bus system in parallel and using different data sample rates. A further object of an example embodiment of the present invention is to enable the integration of externally synchronizable data sources and/or non-externally synchronizable data sources into the circuit system and into the method.

According to an example embodiment of the present invention, a synchronization mechanism for transmitting audio data in a bus system is provided for the circuit system and for the method. In this regard, a PLL circuit is not required for regenerating the (sample) data frequency in the data source. In addition, most of the jitters present in the bus system do not have an effect on the synchronization mechanism.

The synchronization mechanism provided by an example embodiment of the present invention cannot be used for transmitting audio data based on the IEEE 1394 Standard, but instead is used for transmitting other types of data and/or for other applications requiring a fixed coupling between the data source and the data sink. However, the IEEE 1394 Standard, for example, may still be used to achieve a rapid and uncomplicated data exchange, for example, in the entertainment field, between up to 63 devices currently at a maximum of 400 Mbit/second (up to 3,200 Mbit/second are planned).

For this type of data exchange, a fundamental distinction is made between asynchronous data transfer and isochronous data transfer.

In asynchronous data transfer, packets are first transmitted which contain the address of the data source and of the data sink. When the data sink receives the packet, it sends back an acknowledgment packet to the data source, and the transmission of the actual data packet is able to begin.

For isochronous data transfer, an isochronous channel in a specific band width is required between the data source and the data sink. An unambiguous channel identification number (channel ID) is assigned to this channel; the data source then transmits only the channel identification number, followed by the data, and the data sink receives only the data having this channel identification number, a maximum of 64 isochronous channels being possible. The remainder of the bandwidth not occupied by the isochronous transfer is available for the transmission of asynchronous data packets.

According to an example embodiment of the present invention a circuit system (100) and a method for synchronized transmission of audio data streams in a bus system, for example based on the IEEE 1394 Standard, is provided. The sample data frequency of the data source may be recovered in the data sink without a PLL circuit system. The circuit system (100) includes at least one data source (10) which provides audio data packets (AD) to be transmitted, for example, asynchronously and/or isochronously, in addition to frequency data packets (FS) which are associated with the particular audio data packets (AD) to be transmitted, and which are to be transmitted, for example, asynchronously. The data source (10) has at least one clock or timer unit (12) for updating, for example periodically, at least one synchronization cycle or time cycle in the circuit system (100). The data source (10) also has at least one generator unit (14) which is connected (124) to the clock or timer unit (12) and which receives at least one data frequency (Fs). The data frequency (Fs) may be used for reading the particular counter status of the clock or timer unit (12) according to the data frequency (Fs). The data frequency (Fs) may also be used for adding a predetermined, for example, constant, value to the counter status read. The data frequency (Fs) may also be used for entering the value into the frequency data packet (FS). The data frequency (Fs) may also be used for sending the frequency data packet (FS) after a predetermined number of values in the frequency data packet (FS) has been reached. The data source (10) also includes at least one data sink (40), which is connected to the data source (10) via at least one data channel (30, 32) and which receives the audio data packet (AD) to be transmitted, in addition to the particular associated frequency data packet (FS). The frequency data packet (FS) has at least one clock or timer unit (42) for updating, for example, periodically, the synchronization cycle or time cycle. The frequency data packet (FS) also has at least one audio data buffer unit (44) for entering the counter status of the received audio data packets (AD). The frequency data packet (FS) also has at least one data frequency buffer unit (46) for entering the counter status of the received frequency data packets (FS). The frequency data packet (FS) also has at least one comparator unit (48), which is connected (428) to the clock or timer unit (42) and is also connected (468) to the data frequency buffer unit (46). The frequency data packet (FS) is used for comparing the counter status of the clock or timer unit (42) to the counter status of the data frequency buffer unit (46). The frequency data packet (FS) is also used for sending at least one data frequency pulse (fs). The frequency data packet (FS) also has at least one output unit (50), which is connected (445) to the audio data buffer unit (44) and is also connected (485) to the comparator unit (48), for outputting the audio data pulse (ad) read from the audio data buffer unit (44) together with the data frequency pulse (fs) which is transmitted from the comparator unit (48) and which is associated with the audio data pulse (ad).

DETAILED DESCRIPTION

Figure 1:
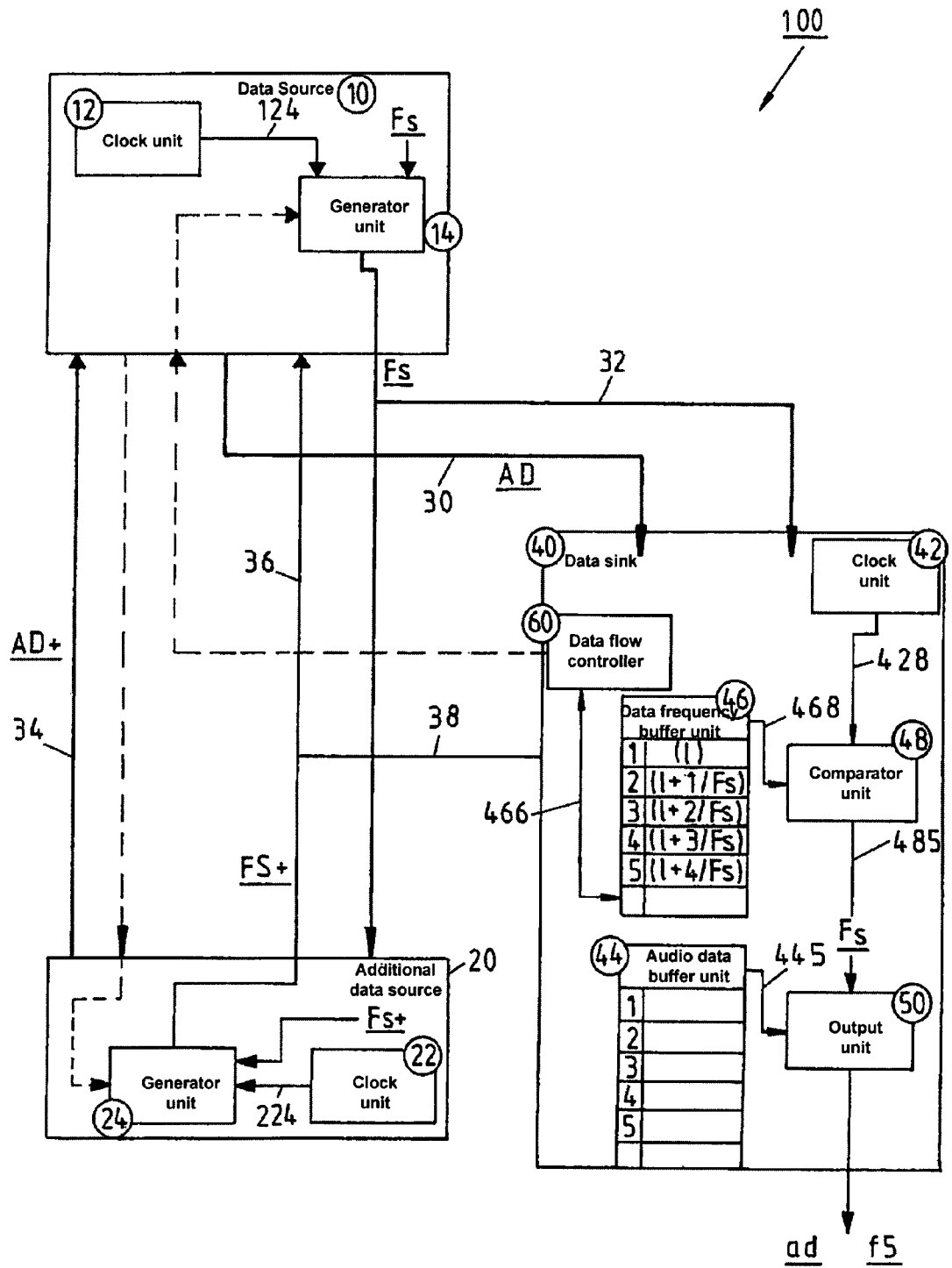
FIG. 1 is a schematic diagram of a circuit system according to an example embodiment of the present invention.

Circuit system 100, according to an example embodiment of the present invention illustrated in FIG. 1, includes a data source 10 as the transmitting unit and a data sink 40 as the receiving unit, as well as an additional data source 20 to be explained in greater detail below. Data source 10, additional data source 20, and data sink 40 each function as bus nodes in the bus system in which circuit system 100 is situated.

In each of data source 10, in additional data source 20, and in data sink 40 a clock or timer unit 12, 22, or 42 is provided which in the case of a bus system based on the IEEE 1394 Standard is a "1394 timer," i.e., a register containing the uniform time base for the entire data bus. The clock or timer unit 12, 22, or 42 is periodically updated with a frequency of approximately 8 Kilohertz, i.e., is set back to the value of the timing register contained in clock or timer unit 12.

In this regard, this value is not set back even when the bus system is reset; this value is not set back to zero unless the timing register overflows. In general, the timing register contained in clock or timer unit 12 forms the basis for the synchronization.

One of the basic functions for both circuit system 100 and the method is carried out in generator unit 14 of data source 10 or in generator unit 24 of additional data source 20. Sample frequency (data frequency) Fs or Fs+ is present at one of the inputs of generator unit 14 or 24, respectively. For each cycle of data frequency Fs or Fs+, generator unit 14 or 24 reads the counter status from the timing register of clock or timer unit 12 or 22, adds a constant value, which is the transmission delay, thereto, and enters the value into an asynchronous frequency data packet FS or FS+.

Figure 2:
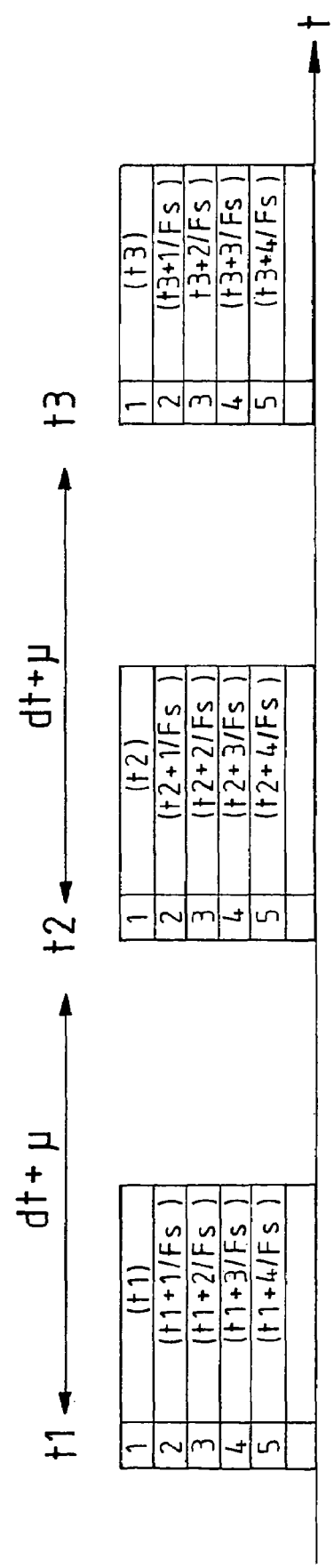
FIG. 2 is a schematic diagram plotted against time of an example asynchronous transmission of three frequency data packets using the circuit system according to FIG. 1.

This is illustrated by FIG. 2, which shows three asynchronous frequency data packets FS, each shifted in time with respect to one another (t3=t2+dt+μ=t1+dt+μ+dt+μ) by time interval dt+μ. It should be additionally noted here that a field which contains information about the contents of the data packet and about the synchronization method used in that instance is to be added in the header of the particular data packet.

After five values have been entered into asynchronous frequency data packet FS or FS+ according to an example embodiment of the present invention, as illustrated in FIG. 2, this asynchronous frequency data packet is transmitted to data sink 40 via data channel 32 or 38, respectively, either "unicast," "broadcast to the group," or "broadcast to all." Data sink 40 enters the received values of transmitted frequency data packet FS into a data frequency buffer unit 46.

In a comparator unit 48, which likewise is associated with data sink 40, the counter states of clock or timer unit 42 arriving via connection 428 are now compared to the first value in data frequency buffer unit 46 arriving via connection 468. When these values are identical, a data frequency pulse fs is output by comparator unit 48 via connecting line 485, which in principle is again the sample frequency or data frequency Fs generated in data source 10, or the sample frequency or data frequency Fs+ generated in additional data source 20.

Simultaneously with the transmission of frequency data packets FS or FS+, audio data packets AD or AD+ containing the associated audio data are transmitted via an asynchronous or isochronous data channel 30 or 34, respectively. These audio samples are entered in data sink 40 into an audio data buffer unit 44. Output unit 50, which likewise is associated with data sink 40 and which is designed in the form of an I2S output unit, for example, reads at every pulse from comparator unit 48 the instantaneous value from audio data buffer unit 44 via connection 445, and sends both values in the form of the audio data pulse and data frequency pulse fs, for example in the I2S format.

By using a data flow controller 60, which likewise is associated with data sink 40, it is possible to avoid idling operation or an overflow of audio data buffer unit 44 and/or data frequency buffer unit 46 in data sink 40. Data flow controller 60 includes a feedback loop to data source 10 (see the dashed line in FIG. 1). Alternatively, or in addition, data flow controller 60 may be used internally, i.e., in data sink 40, to dampen the level of the audio signal in a timely manner during idling operation, in particular in audio data buffer unit 44, thus avoiding an interfering clicking sound in the loudspeaker.

A management unit designated in circuit system 100 in the form of an "audio master" manages a list of all sample frequencies or data frequencies transmitted, i.e., used in the bus system (for the embodiment according to FIG. 1, sample frequencies or data frequencies Fs or Fs+, respectively). If an additional data source 20 is now connected to the bus system, it must first be determined whether or not this additional data source 20 is externally synchronizable.

If this additional data source 20 is externally synchronizable, it is further determined whether, in the bus system, data packets having the corresponding sample frequency or data frequency Fs+ are already being transmitted to additional data source 20. These mechanisms operate between the management unit and data source 10 or additional data source 20.

As indicated above, basically three cases may be distinguished with respect to additional data source 20:

In a first case, additional data source 20 is externally synchronizable, and sample frequency or data frequency Fs+ is already being transmitted; all data sources 10 having an identical sample frequency or data frequency Fs=Fs+ in the bus system are thus synchronized to the same cycle. In this case, additional data source 20 transmits audio data packets AD+ via asynchronous or isochronous channel 34. Further, in this case data sink 40 receives asynchronous frequency data packets FS=FS+via channel 38, and generates sample frequency or data frequency Fs=Fs+ using clock or timer unit 42 and local comparator unit 48.

In a second case, additional data source 20 is not externally synchronizable, and the sample frequency or data frequency is not yet being transmitted. In this case, additional data source 20 generates the frequency data packets having the sample frequency or data frequency, using associated generator unit 24. Further, additional data source 20 also generates audio data packets containing audio samples.

Lastly, in a third case additional data source 20 is not externally synchronizable, and sample frequency or data frequency Fs+ are already being transmitted. In this case, the management unit must determine whether all other data sources having this sample frequency or data frequency are externally synchronizable. When this is established, the management unit transmits to additional data source 20 the assignment to generate data packets containing the sample frequency or data frequency, and the second case previously described sets in. On the other hand, if all other data sources having this sample frequency or data frequency are not externally synchronizable, an additional sample frequency or data frequency is provided, and the second case previously described likewise sets in.

What is claimed is:

1. A circuit system for synchronized transmission of an audio data stream in a bus system, comprising:
   (a) at least one data source configured to provide audio data packets to be transmitted and frequency data packets to be transmitted which are associated with the audio data packets to be transmitted,
      said at least one data source including:
         (i) a first clock or timer unit, the first clock or timer unit configured to update a first synchronization cycle or time cycle in the circuit system, and
         (ii) at least one generator unit connected to the first clock or timer unit and configured to receive at least one data frequency,
      for each of the associated frequency data packets, said at least one data source configured to:
         (a) read a counter status of the first clock or timer unit according to the data frequency,
         (b) add a predetermined value to the counter status of the first clock or timer unit and enter the value into the frequency data packet, and
         (c) send the frequency data packet after a predetermined number of values have been entered into the frequency data packet; and
   (b) at least one data sink connected to the data source via at least one data channel and configured to receive the audio data packets to be transmitted and the associated frequency data packets, without a PLL system, said at least one data sink including:
      (i) a second clock or timer unit, the second clock or timer unit configured to update a second synchronization cycle or time cycle,
      (ii) at least one audio data buffer unit configured to store a counter status of received audio data packets,
      (iii) at least one data frequency buffer unit configured to store the counter status values in received frequency data packets,
      (iv) at least one comparator unit connected to the second clock or timer unit, and connected to the data frequency buffer unit, said comparator unit configured to compare a counter status of the second clock or timer unit to a counter status of the data frequency buffer unit, and configured to send at least one data frequency pulse, and
      (v) at least one output unit connected to the audio data buffer unit and to the comparator unit and configured to output an audio data pulse read from the audio data buffer unit together with the data frequency pulse transmitted from the comparator unit and associated with the audio data pulse.

2. The circuit system as recited in claim 1, wherein the circuit system is based on an IEEE 1394 Standard.

3. The circuit system as recited in claim 1, wherein the data source is configured to transmit the audio data packets and the frequency data packets at least one of asynchronously and isochronously.

4. The circuit system as recited in claim 1, wherein the first clock or timer unit configured to update the first synchronization cycle or time cycle periodically.

5. The circuit system as recited in claim 1, wherein the predetermined value is a constant value.

6. The circuit system as recited in claim 1, wherein the second clock or timer unit is configured to update the second synchronization cycle or time cycle periodically.

7. The circuit system as recited in claim 1, wherein the circuit system is configured to simultaneously transmit the audio data packets and the frequency data packets.

8. The circuit system as recited in claim 1, further comprising:
   at least one data flow controller configured to control data flow between the data source and the data sink.

9. The circuit system as recited in claim 8, wherein at least one of:
   (a) the data flow controller is associated with the data sink;
   (b) the data flow controller is connected to at least one of the audio data buffer unit and the data frequency buffer unit; and
   (c) the data flow controller is configured to prevent an idling operation or an overflow of at least one of the audio data buffer unit and the data frequency buffer unit.

10. The circuit system as recited in claim 8, wherein the data flow controller is configured to provide feedback to the data source.

11. The circuit system as recited in claim 8, wherein the data flow controller is configured to provide feedback to the generator unit of the data source.

12. The circuit system as recited in claim 1, further comprising:
    at least one additional data source configured to provide additional audio data packets to be transmitted and additional frequency data packets associated with the additional audio data packets to be transmitted,
    said additional data source including:
    (a) one of at least one third clock or timer unit configured to update a third synchronization cycle or time cycle, and
    (b) at least one second generator unit connected to the third clock or timer unit and configured to receive at least one additional data frequency,
    said additional data source configured to:
    (a) read a counter status of the third clock or timer unit according to the additional data frequency,
    (b) add a predetermined value to the counter status of the third clock or timer unit and to enter the value into the additional frequency data packet, and
    (c) transmit the additional frequency data packet after a predetermined number of values are entered into the additional frequency data packet.

13. The circuit system as recited in claim 12, wherein the additional data source is configured to transmit the additional audio packets and the additional data packets at least one of asynchronously and isochronously.

14. The circuit system as recited in claim 12, wherein the third clock or timer unit is configured to update the third synchronization cycle or time cycle periodically.

15. The circuit system as recited in claim 12, wherein the predetermined value added t the third clock or timer unit is a constant value.

16. The circuit system as recited in claim 12, wherein the additional data source is connected to the data source via at least one data channel and is also connected to the data sink via at least one data channel.

17. The circuit system as recited in claim 12, further comprising:
    at least one additional data flow controller configured to control a data flow between the additional data source and the data source.

18. The circuit system as recited in claim 17, wherein the additional data flow controller is configured to provide feedback to the additional data source.

19. The circuit system as recited in claim 17, wherein the additional data flow controller is configured to provide feedback to the second generator unit for the additional data source.

20. The circuit system as recited in claim 12, further comprising:
at least one management unit configured to manage the data frequency and the additional data frequency.

21. The circuit system as recited in claim 1, wherein the circuit system is configured to connect to at least one external data source.

22. The circuit system as recited in claim 21, wherein the circuit system is configured, through data exchange between the management unit and the external data source, to determine whether the external data source is externally synchronizable.

23. A method for synchronized transmission of an audio data stream in a bus system, comprising:
updating at least one first synchronization cycle or time cycle by using at least one clock or timer unit, the clock or time unit being associated with at least one data source;
supplying at least one generator unit with at least one data frequency, the at least one generator unit being connected to the clock or timer unit being associated with the data source;
reading a counter status of the clock or timer unit, associated with the data source, according to the data frequency, using the generator unit;
adding a predetermined value to the counter status read to form a counter value;
entering the counter value into a frequency data packet;
sending the frequency data packet after a predetermined number of counter values have been entered into the frequency data packet;
transmitting audio data packets, associated with the frequency data packets, between the data source and at least one data sink which is connected to the data source via at least one data channel;
receiving the audio data packets and the associated frequency data packet, using the data sink;
updating a second synchronization cycle or time cycle by using at least one clock or timer unit associated with the data sink without a PLL system;
entering a counter status of each of the received audio data packets in at least one audio data buffer unit associated with the data sink;
entering the counter values of the received frequency data packets in at least one data frequency buffer unit associated with the data sink;
comparing a counter status of the clock or timer unit associated with the data sink to the counter values of the data frequency buffer unit, using at least one comparator unit which is connected to the clock or timer unit associated with the data sink and is connected to the data frequency buffer unit;
sending at least one data frequency pulse by the comparator unit; and
outputting an audio data pulse from the audio data buffer unit together with the data frequency pulse which is transmitted from the comparator unit and which is associated with the audio data pulse, using at least one output unit which is connected to the audio data buffer unit and is connected to the comparator unit, and which is associated with the data sink.

24. The method as recited in claim 23, wherein the method is based on an IEEE 1394 Standard.

25. The method as recited in claim 23, wherein the updating of the first synchronization cycle or time cycle is performed periodically.

26. The method as recited in claim 23, wherein the predetermined value is a constant value.

27. The method as recited in claim 23, wherein the step of transmitting the audio data packets includes transmitting the audio data packets at least one of asynchronously and isochronously.

28. The method as recited in claim 23, wherein the sending of the frequency data packet includes asynchronously transmitting the frequency data packet.

29. The method as recited in claim 23, wherein the updating of the second synchronization cycle or time cycle is periodic.

30. The method as recited in claim 23, wherein the audio data packets and the frequency data packet are transmitted simultaneously.

31. The method as recited in claim 23, further comprising:
controlling data flow between the data source and the data sink using at least one data flow controller, said data flow controller being connected to at least one of the audio data buffer unit and the data frequency buffer unit, and being associated with the data sink.

32. The method as recited in claim 31, further comprising:
preventing an idling operation or an overflow of at least one of the audio data buffer unit and the data frequency buffer unit using the data flow controller.

33. The method as recited in claim 31, further comprising:
providing feedback to the data source using the data flow controller.

34. The method as recited in claim 31, further comprising:
providing feedback to the generator unit of the data source using the data flow controller.

35. The method as recited in claim 23, further comprising:
updating a third synchronization cycle or time cycle using at least one third clock or timer unit which is connected to the data source via at least one second data channel, and is connected to the data sink via at least one third data channel and which is associated with at least one additional data source;
supplying at least one second generator unit, which is connected to the third clock or timer unit and which is associated with the additional data source, with at least one additional data frequency;
reading a counter status of the third clock or timer unit according to the additional data frequency using the second generator unit;
adding a second predetermined value to the counter status of the third clock or timer unit to form a counter value;
entering the counter value into an additional frequency data packet; and
sending the additional frequency data packet after a predetermined number of counter values have been entered into the additional frequency data packet.

36. The method as recited in claim 35, wherein the updating of the third synchronization cycle or time cycle includes periodically updating the third synchronization cycle or time cycle.

37. The method as recited in claim 35, wherein the second predetermined value is a constant value.

38. The method as recited in claim 35, further comprising:
controlling data flow between the additional data source and the data source using at least one additional data flow controller.

39. The method as recited in claim 38, further comprising:
providing feedback to the generator unit of the additional data source using the additional flow controller.

40. The method as recited in claim 35, further comprising:
managing at least one of the data frequency and the additional data frequency using at least one management unit.

41. The method as recited in claim 35, further comprising:
connecting at least one external data source to one of the first clock and first timer unit.

42. The method as recited in claim 41, further comprising:
using data exchange between the management unit and the external data source to determine whether the external data source is externally synchronizable.

* * * * *